April 3, 1934.  J. S. LEEB ET AL  1,953,242
FLUID PRESSURE BRAKE CONTROL
Filed March 18, 1929  3 Sheets-Sheet 1
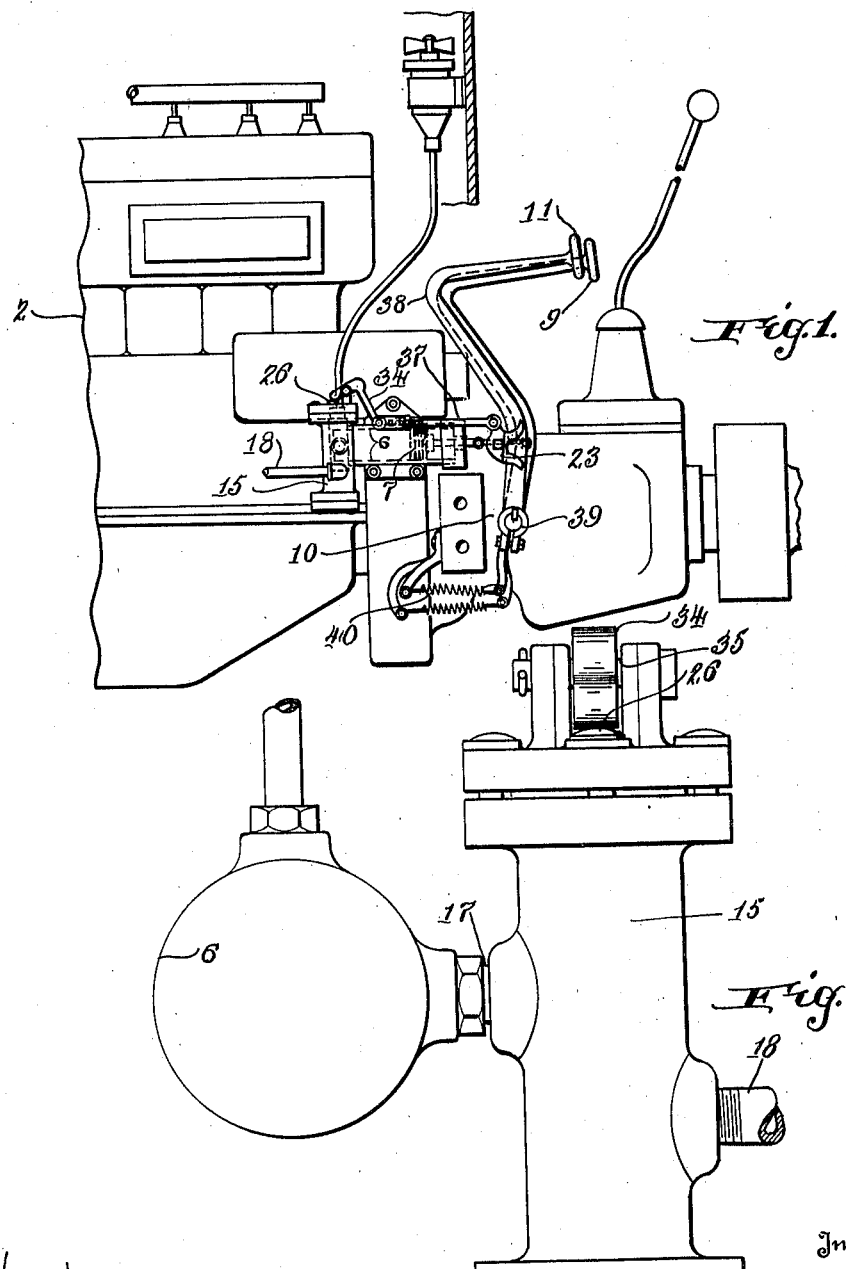

April 3, 1934.  J. S. LEEB ET AL  1,953,242

FLUID PRESSURE BRAKE CONTROL

Filed March 18, 1929  3 Sheets-Sheet 2

April 3, 1934. J. S. LEEB ET AL 1,953,242
FLUID PRESSURE BRAKE CONTROL
Filed March 18, 1929   3 Sheets-Sheet 3
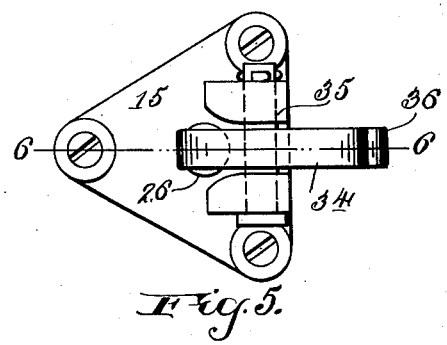
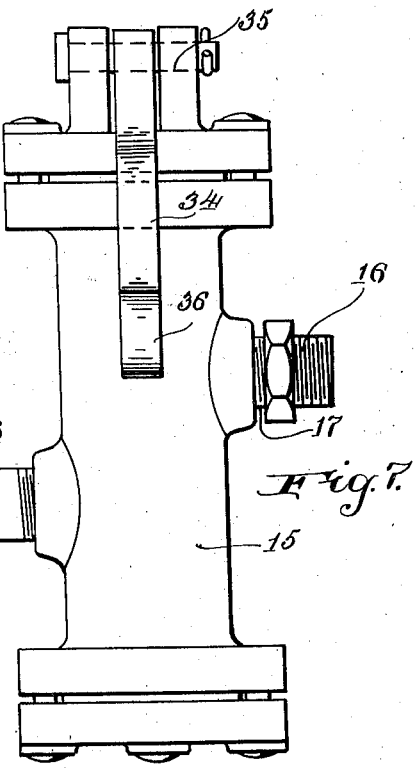
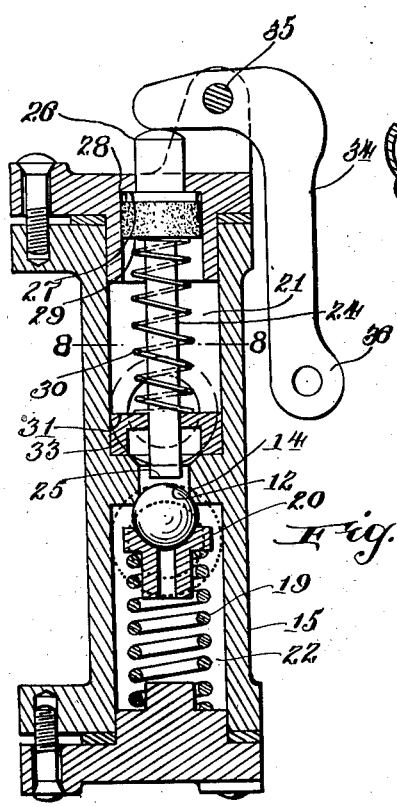
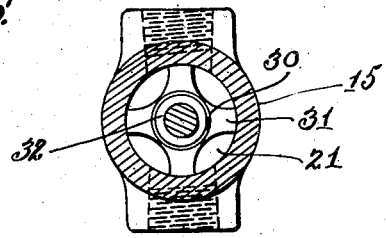

Patented Apr. 3, 1934

1,953,242

UNITED STATES PATENT OFFICE 1,953,242

FLUID PRESSURE BRAKE CONTROL

John S. Leeb and Charles J. Huber, Baltimore, Md.

Application March 18, 1929, Serial No. 347,874

4 Claims. (Cl. 192—13)

The present invention relates broadly to braking systems for vehicles, and more particularly to so-called fluid braking systems or hydraulic systems for automobiles, although the utility of the invention is not limited thereto.

Most motor vehicle operatives at the present time control the operation of their cars almost entirely by the use of the brake, the clutch, and the foot accelerator or foot-operated throttle control. Although a hand throttle is provided, it is seldom used during the normal operation of the great majority of automobiles.

Due to this practice of almost entirely utilizing the feet for the control or mechanical operation of an automobile so that the hands are left free for steering, signaling and manipulation of the lights, considerable difficulty is not infrequently encountered in the operation of automobiles on relatively steep up-grades. In stopping in such a position, the foot brake and clutch are usually both depressed, thereby requiring the use of both of the feet. If one foot is transferred from the brake pedal to the foot accelerator, in order to produce forward operation of the car, the car has a tendency upon release of the brakes and prior to engagement of the clutch, to start backwardly.

Under such conditions, it sometimes happens that the sudden load thrown on the motor produces stalling thereof.

As alternatives, the operator may slip the clutch, thereby making it serve as both a brake and clutch, which practice is condemned as being harmful to the car, or use may be made of the hand throttle or the emergency brake. Both of these, however, involve an abnormal operation to which the average driver is not accustomed, and at best such an operation is inconvenient or awkward.

The present invention has for one of its objects the provision of an improved braking system in which difficulties of operation of the character referred to are obviated.

In view of the increasing popularity of so-called fluid pressure or hydraulic brake systems, we have illustrated the present invention in connection with such a system, the various controls being so arranged that it is possible to maintain at will, an effective braking pressure, or to release such pressure.

In the accompanying drawings, in which a preferred embodiment of our invention is illustrated:

Figure 1 is a fragmentary side elevation of the power plant of a motor vehicle including in addition to the motor, the transmission casing and brake pedal mechanism;

Figure 2 is a side elevation of the controller chamber or housing, shown in connection with the brake pressure generating cylinder;

Figure 5 is a top plan view of the brake controller chamber showing the lever on a slightly enlarged scale;

Figure 6 is a section through the same on the line 6—6 of Figure 5;

Figure 7 is an elevation of the brake controller chamber or casing looking from the right in Figure 6; and Figure 8 is a section on the line 8—8 of Figure 6 looking downward.

Figure 3:
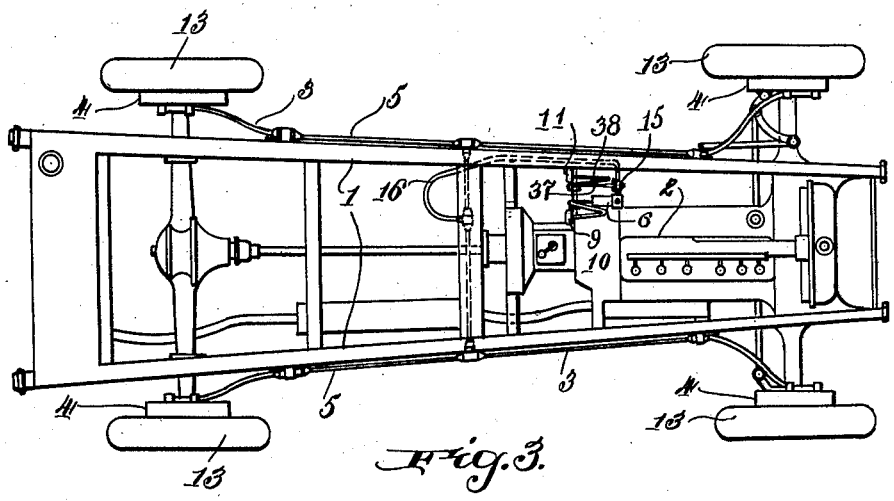
Figure 3 is a top plan view of a motor vehicle chassis equipped with hydraulic brakes and including the brake control of the invention.

In carrying out the present invention, there may be utilized a chassis 1, of any well-known or special design, equipped with a suitable power plant 2, and braking system 3. This latter system, if of the prevailing type, includes brake units 4, for each of the wheels 13. These units in turn have connections 5, extending between the same and a main pressure line 16 connected to pressure cylinder 6.

Within the pressure cylinder 6 is a piston 7, operatively connected in any desired manner to a brake pedal 9. There is also any suitable type of clutch 10 operated by clutch pedal 11.

In accordance with the illustrated embodiment of the present invention, there may be provided a controller valve 12 (Figure 6) cooperating with a seat 14 within a valve casing 15. This valve casing is conveniently located near the cylinder 6 and in the pressure line 16 at a point intermediate the pressure cylinder 6 and the individual brake connections 5.

For purposes of a clearer understanding of the present invention, the pressure line 16 will hereinafter be considered as comprising a section 17, extending between the pressure cylinder 6 and the valve casing 15, and a second section 18 leading from the valve casing 15 for transmitting through a pressure therefrom.

As indicated in Figure 6, the valve 12 is of the non-return type, comprising a ball normally held against its seat by a spring 19, and movable away from the seat at the will of the operator, as hereinafter more fully described. The seat 14, together with the valve, divides the valve casing 15 into an upper chamber 21 and a lower chamber 22. The section 17 on the line 16 is connected to the upper chamber 21, while the section 18 is connected to the lower chamber 22.

With a construction of the character described, the depression of the brake 9 operates the piston 7 and forces fluid under pressure from the cylinder 6 through the connection 17 into the chamber 21. This pressure in turn unseats the valve 12 so that the pressure is transmitted through the pipe section 18 to the connections 5 and the individual brake units, for applying the brakes. When the pressure on the brake pedal 9 is relieved, the valve 12 is returned to its seat by the spring 19 so that the pressure which has been established in the various connections 5 for applying the brake units, is retained in the system, and the brakes are held in their applied position. In this manner, if the car is brought to a forced stop on an up-grade, undesired backward movement of the car is prevented without any unusual or additional operation by the driver.

It is obviously necessary, however, in order to permit the driver to resume the operation of his car, to provide means for unseating the valve 12 at his own pleasure, so that the brakes may be released. This unseating may be accomplished in any one of a number of different ways, depending upon the particular construction of the valve which, as will be understood by those skilled in the art may assume any one of a wide variety of different forms, or in accordance with the desire of a particular operator. It may to the best advantage be released by a part of the control system which is ordinarily provided, and we have shown the release mechanism as interconnected with the clutch pedal in such manner that a movement of the clutch pedal to effect engagement of the clutch simultaneously releases the brakes and permits the motor to drive the vehicle. It will be clearly understood, however, that such an operation is definitive only of one embodiment of our invention, and does not limit the same to such an operation. With this thought in mind, the clutch pedal 11, which in this respect is representative merely of any desired form of control, will hereafter be referred to as the brake release means.

Extending through the chamber 21 is a thrust rod 24 in alignment with the valve 12. With the valve in its closed position, the lower end 25 of the thrust rod preferably assumes a position slightly spaced from the valve.

The upper end 26 of this rod extends upwardly through the cylinder 15, its upward movement being limited by an abutment 27 engaging the top wall 28 of the chamber 21. The lower side 29 of this abutment cooperates with a spring 30 bearing at its opposite end against a spider 31, providing a guide opening 32 for the thrust rod, and having positioning arms 33 bearing against the bottom of the upper chamber. The spring 30 is effective under normal operation of the parts for holding the thrust rod in its upper position, thereby leaving the valve 12 free to function in the manner described.

Figure 4:
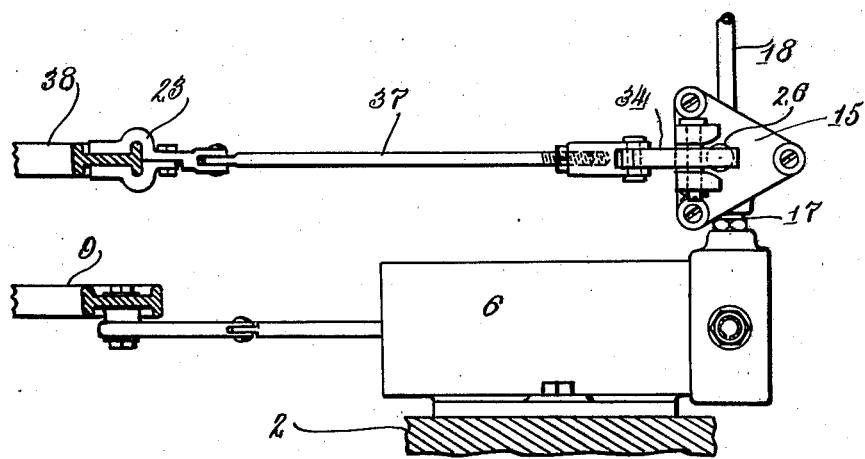
Figure 4 is a top plan view of the brake pressure cylinder and controller chamber, the same being on an enlarged scale as compared to Figure 3.

Cooperating with the upper end of the thrust rod is a bell crank 34 having a pivotal mounting 35, and provided with a depending arm 36 connected by means of a rod 37 to the arm 38 of the pressure release means 11. This connection may conveniently comprise a two-part clamp 23, as illustrated more particularly in Figure 4 of the drawings.

The brake release means 11, as is customary in the art, may have a pivotal mounting 39 adjacent its lower end, and may be normally held in a position corresponding to the engaged position of the clutch primarily by means of a spring 40 connected at one end to the brake release means and at the other end to a suitable part of the vehicle chassis. In this position, the arm 36 of the bell crank lever 34 is drawn to the right, as viewed in Figure 6 of the drawings, and as illustrated in Figure 1. At such times it engages the end 26 of the thrust rod 24, thereby depressing the thrust rod and opening the valve 12.

With such a construction, it will be apparent that the valve 12 during the normal operation of the vehicle is held in open position, so that there is no impedance to the normal release of the brakes when the foot is taken from the brake pedal. When, however, pressure is simultaneously applied both to the brake pedal 9 and to the clutch pedal or brake release means 11, the thrust rod 24 is permitted to move out of engagement with the valve 12, whereby this valve is free to close communication between the chambers 21 and 22 in such manner that while fluid pressure may be transmitted from the pressure cylinder 6 into the chamber 21, and thence past the valve 12 for applying the brakes, this pressure is held against dissipation by the valve 12 so that the brakes are maintained in their applied positions. This condition continues until such time as the operator at his own volition operates the brake release means 11 in order to effect normal engagement of the clutch.

While this interlocking of the clutch and the brake releasing operation is in many cases extremely desirable in that it prevents engagement of the clutch with the brakes held against release, and thereby makes the operation automatic, it is not essential to the attainment of all of the advantages arising from the present invention.

The expression "brake release means" is therefore descriptive, where used, of any such control.

While we have herein illustrated and described specifically and in detail one preferred embodiment of the present invention in order that the nature, manner of operation, construction, and use of the invention may be fully understood, it will be apparent to those skilled in the art that changes in the construction, operation, and arrangement of the parts may be made within the scope of the appended claims without departing from the spirit or scope of our invention.

We claim:—

1. The combination with a fluid pressure brake system for motor vehicles the same comprising a source of fluid under pressure and a brake unit connected thereto of a non-return valve between the source of fluid under pressure and the brake unit and opening toward the brake unit and a clutch pedal with a spring holding the clutch pedal normally in a position corresponding to the engaged position of the clutch, means for unseating the valve, means connected to the clutch pedal to operate said unseating means to hold the valve open when the clutch is engaged.

2. The combination with the chassis and running gear of a motor vehicle having a clutch normally engaged and clutch operating means and a fluid pressure brake with a source of fluid under pressure, of a valve which opens to admit the fluid to the brake and tends to close to prevent the escape of the fluid from the brake, means connected to the clutch to open said valve to release the fluid from the brake when the clutch is engaged, the valve being permitted to close and prevent the release of fluid from the brakes when the clutch is disengaged.

3. The combination with the chassis and running gear of a motor vehicle having clutch mechanism normally engaged and fluid pressure brakes with a source of fluid under pressure, a valve controlling the release of the fluid from the brakes, said valve being in the form of a non-return valve opening in the direction of the brake applying pressure, a casing for said valve and a seat for the valve in the casing dividing the casing into two chambers, a spring in one chamber tending to close the valve, a thrust rod in the other chamber adapted to engage the valve oppositely to said spring, a spring tending to withdraw said thrust rod from the valve, means for applying a thrust to said rod to open the valve, said means being connected to the clutch mechanism whereby the valve is permitted to close preventing the release of fluid from the brakes when the clutch is released and is opened to permit the release of fluid from the brakes when the clutch is engaged.

4. The combination with the chassis and running gear of a motor vehicle having clutch mechanism and fluid pressure brakes with a source of fluid under pressure, a valve controlling the release of the fluid from the brakes, said valve being in the form of a non-return valve opening in the direction of the brake applying pressure, a casing for said valve and a seat for the valve in the casing dividing the casing into two chambers, a spring in one chamber tending to close the valve, a thrust rod in the other chamber adapted to engage the valve oppositely to said spring, a spring tending to withdraw said thrust rod, means for applying a thrust to said rod to open the valve, said means being connected to the clutch whereby the valve is permitted to close preventing the release of fluid from the brakes when the clutch is released and is opened to permit the release of fluid from the brakes when the clutch is engaged, said thrust applying means comprising a bell crank lever having one arm engaging the thrust rod oppositely to the valve, and means connecting the other arm of the bell crank lever to the clutch mechanism.

JOHN S. LEEB.
CHARLES J. HUBER.